United States Patent [19]

Priem et al.

[11] Patent Number: 5,652,793
[45] Date of Patent: Jul. 29, 1997

[54] METHOD AND APPARATUS FOR AUTHENTICATING THE USE OF SOFTWARE

[75] Inventors: Curtis Priem, Fremont; David S. H. Rosenthal, Palo Alto, both of Calif.

[73] Assignee: NVidia Corporation, Sunnyvale, Calif.

[21] Appl. No.: 436,143

[22] Filed: May 8, 1995

[51] Int. Cl.$^6$ .................. H04L 9/00; H04L 9/06
[52] U.S. Cl. .................. 380/4; 380/23; 380/25; 380/29; 380/49; 380/50; 340/825.31; 340/825.34
[58] Field of Search .................. 380/4, 23, 25, 380/49, 50, 29, 44, 46; 235/380; 340/825.31, 825.34

[56] References Cited

U.S. PATENT DOCUMENTS

| | | | |
|---|---|---|---|
| 4,599,489 | 7/1986 | Cargile | 380/4 |
| 4,609,777 | 9/1986 | Cargile | 380/4 |
| 5,012,514 | 4/1991 | Renton | 380/4 |
| 5,058,162 | 10/1991 | Santon et al. | 380/25 |
| 5,282,247 | 1/1994 | McLean et al. | 380/4 |
| 5,375,243 | 12/1994 | Parzych et al. | 380/4 X |

*Primary Examiner*—Bernarr E. Gregory
*Attorney, Agent, or Firm*—Stephen L. King

[57] ABSTRACT

A hardware encoding circuit which generates a code value unique to a particular computer, stores a password unique to an application program and to the particular computer, tests the stored password against a verification value generated by the hardware encoding program each time the application program is run, and generates an error signal if the stored password and the verification value do not match.

9 Claims, 2 Drawing Sheets

METHOD AND APPARATUS FOR AUTHENTICATING THE USE OF SOFTWARE

BACKGROUND OF THE INVENTION

1. Field Of The Invention

This invention relates to computer circuitry and, more particularly, to apparatus and a method for assuring that an application program which is run on a computer is authorized to run on such circuitry.

2. History Of The Prior Art

If an application program is to be executed by a computer, it must be read into the computer's memory from whatever medium (e.g., floppy disk or CD-ROM) was used to supply it to the user. If the application is read into memory it can normally be written to some other storage medium. Since application programs are copyable, anyone who has purchased an application program may copy that program for use by someone else. Because of this, the manufacture and sale of software for personal computers are especially subject to fraud.

There have been various attempts to stop copying in the personal computer industry by varying the format by which an application is placed on the media so that the data cannot be copied using standard utility programs. However, application programs on magnetic media may be easily destroyed or damaged; and buyers are generally unwilling to spend significant sums for any application program which they cannot back up so these attempts have been commercially unsuccessful.

To stop illegal use of software used on workstations, manufacturers have assigned unique numbers to each workstation and prepared a password for each physical piece of software authorized to be used on a particular workstation. When an authorized program is run on a workstation, the value of the password is tested against the workstation number by a software process within the application program, and if the values check; the machine operates. When the values do not check, something undesirable from the standpoint of the operator occurs. This method of monitoring against unauthorized use has cut down the illegal use of software on workstations. However, it is not too difficult to modify the software of the application program so that it will run on a workstation even though the workstation is numbered incorrectly for the particular password. Typically, portions of the copied program which would invoke the check of password against machine number are simply removed from the program.

Unfortunately, personal computers are not equipped with unique identification numbers; and there is presently no useful system in effect for curtailing the use of copied software. Moreover, even were the workstation system of checking to be utilized, it is sufficiently easy to work around that it would only slow the fraudulent use of software for a period until the methods for defeating the safeguard had been passed around to the various computer bulletin boards.

It is very desirable to provide apparatus and a method of reducing the risk that personal computer software which may be copied may then be used without authorization of the manufacturer.

SUMMARY OF THE INVENTION

It is, therefore, an object of the present invention to provide apparatus and a method by which the use of unauthorized software may be precluded on a personal computer.

This and other objects of the present invention are realized by a hardware encoding circuit which generates a code value unique to a particular computer, stores a password unique to an application program and to the particular computer, tests the stored password against a verification value generated by the hardware encoding program each time the application program is run, and generates an error signal if the stored password and the verification value do not match.

These and other objects and features of the invention will be better understood by reference to the detailed description which follows taken together with the drawings in which like elements are referred to by like designations throughout the several views.

NOTATION AND NOMENCLATURE

Some portions of the detailed descriptions which follow are presented in terms of symbolic representations of operations on data bits within a computer memory. These descriptions and representations are the means used by those skilled in the data processing arts to most effectively convey the substance of their work to others skilled in the art. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary or desirable in most cases in any of the operations described herein which form part of the present invention; the operations are machine operations. Useful machines for performing the operations of the present invention include general purpose digital computers or other similar devices. In all cases the distinction between the method operations in operating a computer and the method of computation itself should be borne in mind. The present invention relates to a method and apparatus for operating a computer in processing electrical or other (e.g. mechanical, chemical) physical signals to generate other desired physical signals.

DETAILED DESCRIPTION

Figure 1:
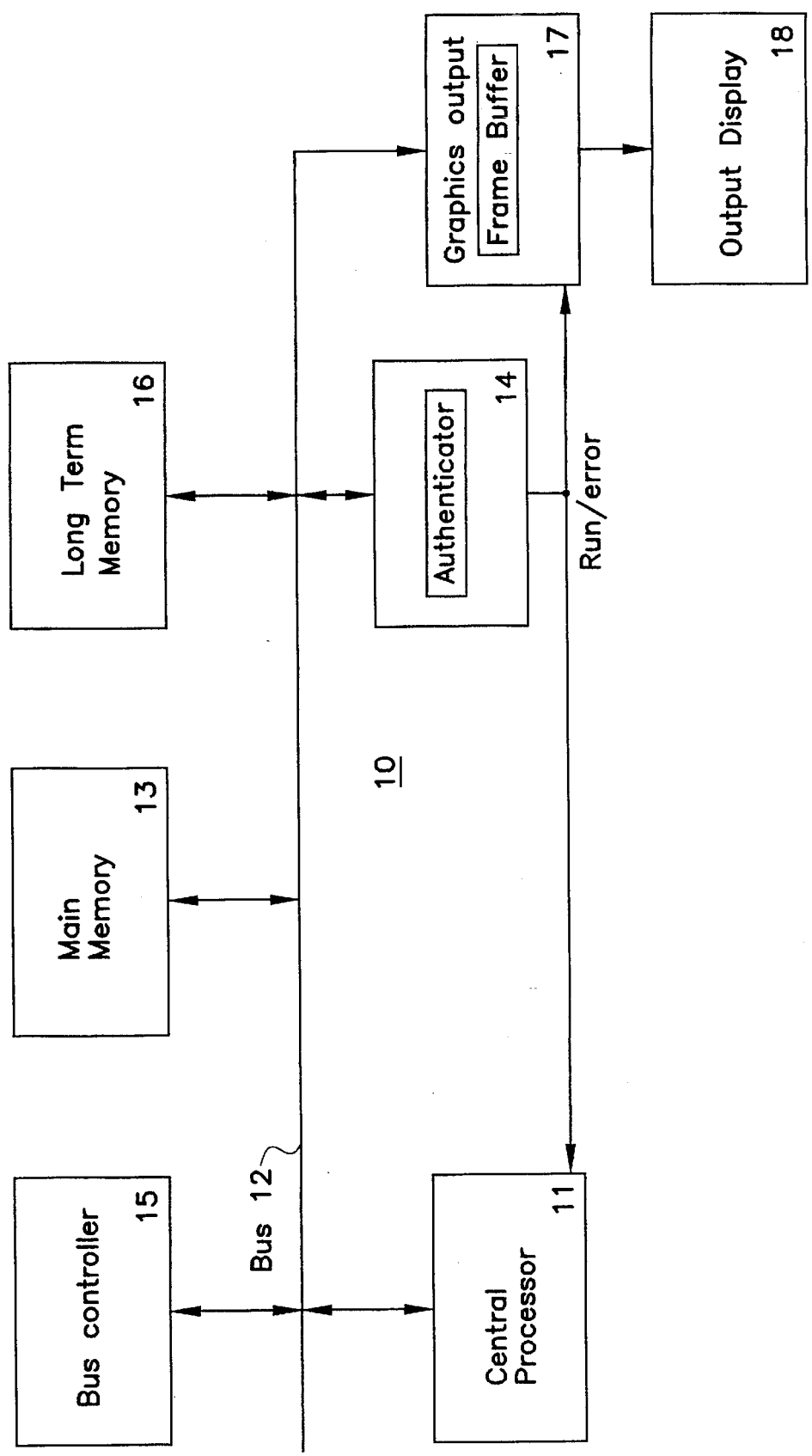
FIG. 1 is a block diagram of a computer system which may include the present invention.

Referring now to FIG. 1, there is illustrated a block diagram of a computer system 10 configured to utilize the present invention. The system 10 includes a central processing unit 11 which executes the various instructions provided to control the operations of the system 10. The central processing unit 11 is joined to a bus 12 adapted to carry information between the various components of the system 10. Joined to the bus 12 is main memory 13 which is typically constructed of dynamic random access memory arranged in a manner well known to those skilled in the prior art to store information during a period in which power is provided to the system 10.

Also connected to the bus 12 are various peripheral components such as long term memory 16 and circuitry such as a graphics output control device 17 which may include a frame buffer to which data may be written that is to be transferred to an output device such as a monitor 18 for display.

Various other well known input/output devices may be joined to the bus 12 in a manner well known to those skilled in the art. As is known, such input/output devices are typically connected to the bus through standard arrangements in which a circuit board containing the component circuitry of the peripheral device is plugged into a slot connector provided for connecting to the bus 12. The present invention, in one embodiment may be a part of such a component circuit which may be plugged into the bus in order to obtain its benefits. For example, an input/output device 14 may include authenticator circuitry utilized in the present invention. Alternatively, a graphics output control device 17 for controlling the operation of a frame buffer may include circuitry utilized in the present invention. Alternatively, the present invention may be implemented in circuitry connected to the bus 12 in some other manner than through plug-in connectors.

Figure 2:
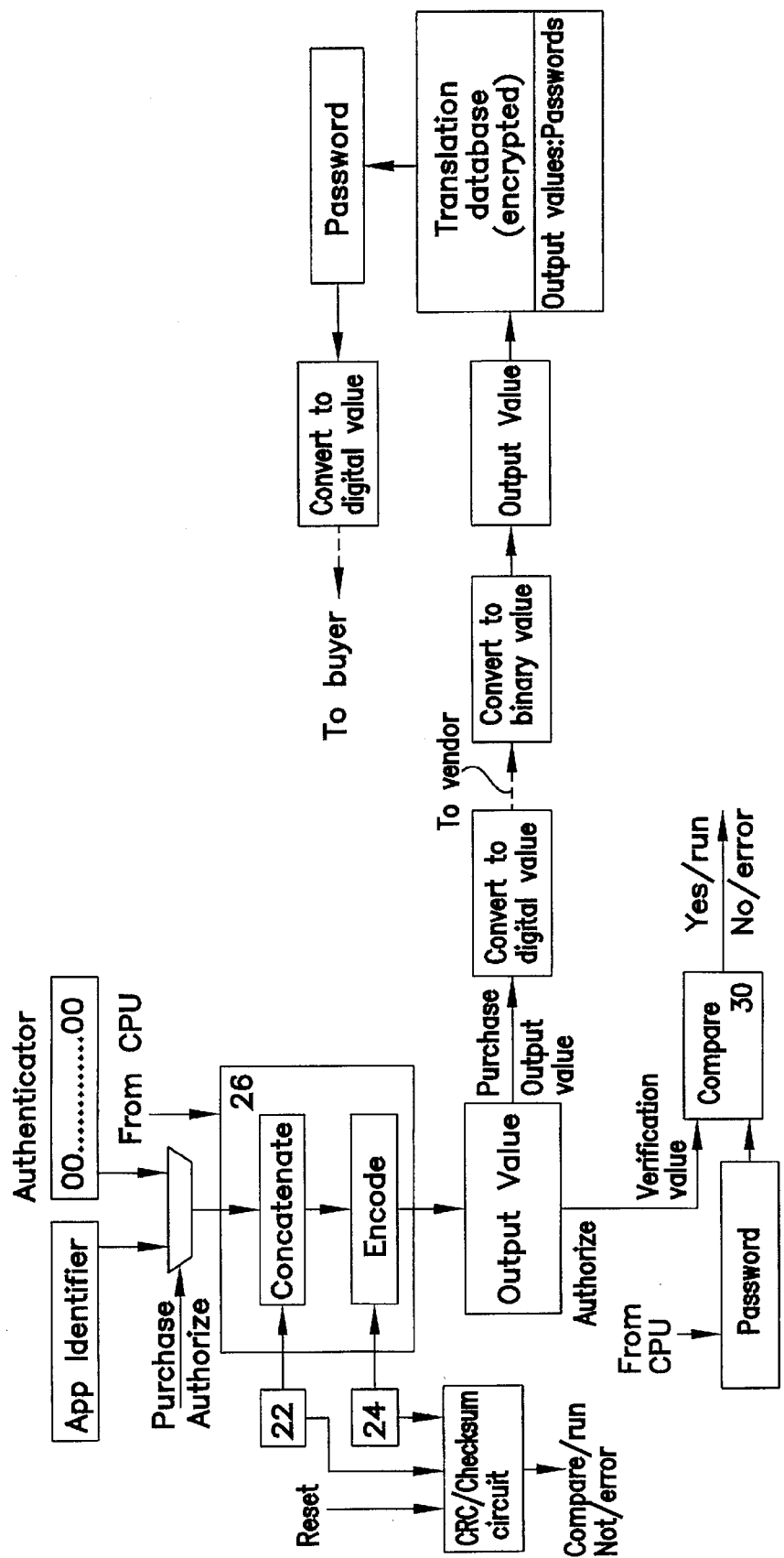
FIG. 2 is block diagram illustrating in detail the system of FIG. 1 used in implementing the present invention.

FIG. 2 illustrates in detail block diagrams of circuitry utilized in practicing the present invention. The circuitry includes long term storage devices 22 and 24 such as EPROM devices in which are stored binary numbers. One of these numbers is a plaintext number which is stored in device 22 and in a preferred embodiment is 48 bits in length. This value is a random number which is unique to the peripheral component (e.g., the graphic controller 17) or other circuit component and thus uniquely identifies the computer in which the component is placed. A second binary number which is stored in device 24 and is 56 bits in length in one embodiment is a random number which functions as a key value that is utilized to encode the plaintext value. Neither of these numbers may be read by the central processing unit 11 of the system 10.

However, the circuitry also includes an encoding circuit 26 which provides a hardware encoding program which may be initiated by a software purchasing program run on the central processing unit 11. The software program is referred to as a purchasing program because it is especially useful when used in conjunction with an arrangement by which a buyer may purchase the software utilizing electronic downloading, free distribution, or some similar method of obtaining the program. A user who has obtained the application program in some manner may pay for it by running the software purchasing program which is a part of the application program. This initiates the hardware encryption process of the encoding program and produces the output value.

When the purchasing program is run, the hardware encoding program first concatenates the plaintext value in storage device 22 with a string of zeroes (sixteen in the preferred embodiment) and then encodes the concatenated 64-bit result using the key value from device 24 in a preselected cryptographic algorithm to produce an output value. This output value then represents a unique value for this particular machine. The user transfers the output value to the vendor of the application program (such as the software producer) who responds with a code value representing the application. This transfer by the user may be accompanied by some form of payment such as a credit card number. This code value or password for the application program is obtained from a database used by the vendor. The database includes a password for each output value which may be generated by any computer which includes a peripheral component having circuitry designed in accordance with the present invention. Each password for a particular machine is generated originally by concatenating a non-zero random value (referred to as an application identifier) assigned to the application program equal in length to the string of zeroes used by the particular machine (sixteen bits in the preferred embodiment) with the same unique plaintext value stored in the particular machine, and then encoding the result using the same encoding algorithm and the same unique key value as are stored in the particular machine. This produces a sixty-four bit code value or password which is unique to the machine for that application program. It will be noted that the password (code value) and the output value are produced identically except that the output value is generated using a string of zeroes while the password is generated using an application identifier unique to the application program.

This application password from the database of the vendor is transferred back to the buyer. The buyer furnishes the password to the application program, and the password value is stored in an application password file with the original output value for the computer and the application identifier. At intervals during each time the application is run, the application writes its stored password and its sixteen bit application identifier to the input/output device containing the encryption hardware. To do this, an authorization program uses the original output value and the application identifier to retrieve the stored password from the password file. This password is sent to a comparator circuit 30 while the application identifier is sent to the encoding circuit 26. The authorization program starts the hardware encoding program which is run by the encoding circuit 26 and runs that program in an authorization mode. The encoding circuit 26 concatenates the application identifier (e.g., the same sixteen bits originally used to generate the passwords for the vendor) and the (secret) plaintext value in the EEPROM storage device 22 and encodes the concatenated result with the (secret) key value in the EEPROM storage device 24 to produce a verification value which should be identical to the password furnished by the vendor. The verification value is sent to the comparison circuit 30 and compared to the password. If the values are the same, the program may be run normally. If they differ, some error result entails. For example, the operation of the computer may be slowed, the quality of the presentation may be degraded, the computer may be stopped, or some other result may occur which makes running the application frustrating or otherwise uninviting.

As an additional feature, one embodiment of the present invention stores a cyclical redundancy check (CRC) value or a checksum value generated using the plaintext and the key values held in the storage 22 and 24. For example, a checksum may add the bytes of all of the values as though they were binary numbers to arrive at a sum which is then put into twos complement form. The correctness of the values is determined by again adding the bytes of all of the values and the checksum; this should produce zero. A CRC value is computed using a somewhat more complicated algorithm to produce a larger number (typically, one to four bytes). The correctness of the original values is tested by generating the CRC value again and comparing it with the stored CRC value. In the present invention, the plaintext and the key values are read at reset (power up) and verified by testing with the CRC or checksum value. If the result is that the values do not test correctly with the CRC or checksum value, then an error is generated which may cause a result similar to the error generated by failure of the password to test correctly so that the machine functions incorrectly.

It will be noted that in order to provide the security necessary to assure that a copy of the program may not be used without authorization, the plaintext and key values stored in the machine cannot be read by the central processing unit except through the hardware program. Moreover, the value which is tested against the password furnished by the vendor is reconstructed whenever the application program and its authorization program are run. By requiring the reconstruction of the value against which the password is tested, no values are available in software from which a comparison may be made for generating a password by a person not authorized to run the software. Moreover, if the authenticating hardware is placed at an address on a component chip which address is shared by other functions on the chip and a match of passwords is required in order to run the application program properly, the ability of the user to remove the code from the operation requiring a password is made more difficult.

A preferred encoding algorithm is the data encryption standard (DES) algorithm approved by the government and published for a number of years. A detailed explanation of the DES algorithm is provided, for example, at pages 219–241, *Applied Cryptography*, B. Schneier, published 1994 by John Wiley as Sons, Inc. Other encrypting algorithms might also be utilized to provide secure encoding of the machine value and comparison of the password with the passwords available for that machine.

Various methods of transferring the output value and the password between the buyer and the vendor for the sake of convenience. For example, these values may each be translated from binary to digital values which may be transmitted by telephone push buttons or other electronic means. These values may also have a cyclical redundancy check (CRC) value added in a manner well known to those skilled in the art in order that the correctness of the values transmitted to and from the vendor may be checked. This allows a simple telephone arrangement to be provided by which a code value may be received, translated into a password, and the password sent back to the buyer. Other means of use will occur to those skilled in the art. As described above, it is convenient to utilize some form of electronic or telephonic transfer of some form of payment; and this payment may also accomplished at the same time as the output value is transferred.

Moreover, a software vendor has only the output values and passwords for one application identifier. The software vendor does not have the plaintext and the keys. Consequently, the vendor cannot generate passwords for applications from other vendors.

Although the present invention has been described in terms of a preferred embodiment, it will be appreciated that various modifications and alterations might be made by those skilled in the art without departing from the spirit and scope of the invention. The invention should therefore be measured in terms of the claims which follow.

What is claimed is:

1. A system for assuring that software is utilized only on computers for which it has been specifically authorized comprising a circuit within a computer for providing a code value which is unique to the computer, the circuit being a part of the computer and a separate circuit from any central processor and being joined to receive signals on an input/output bus, means deriving a password from a database of code values and passwords which enable the use of an application program on a computer, means storing a password from the database in the computer, means for generating a verification value whenever the application program is run, and means for testing the password stored in the computer and the verification value, and means for degrading the operation of the computer if the password and the verification value do not match.

2. A system for assuring that software is utilized only on computers for which it has been specifically authorized as claimed in claim 1 in which the means generating a verification value whenever the application program is run comprises:

a hardware circuit for encrypting a first value and a second value using a third value whenever the application program is run.

3. A system for assuring that software is utilized only on computers for which it has been specifically authorized as claimed in claim 2 further comprising a circuit for verifying the accuracy of the first and third values, and means for degrading the operation of the computer if the first and the third values do not verify.

4. A system for assuring that software is utilized only on computers for which it has been specifically authorized as claimed in claim 2 in which the hardware circuit includes means running an encryption algorithm, storage for a first value which is a random number, storage for a third value which is a random number, and software means for providing a second value which is unique to the application program.

5. A system for assuring that software is utilized only on computers for which it has been specifically authorized as claimed in claim 1 in which the circuit within a computer for providing a code value which is unique to the computer includes a hardware circuit running an encryption algorithm, storage for a first value which is a random number, storage for a third value which is a random number, and means for providing a second value.

6. A system for assuring that software is utilized only on computers for which it has been specifically authorized as claimed in claim 1 in which the circuit within a computer for providing a code value which is unique to the computer includes a hardware circuit running an encryption algorithm, storage for a first value which is a random number, storage for a third value which is a random number, and means for providing a second value; and in which the means generating a verification value whenever the application program is run comprises:

the hardware circuit running an encryption algorithm, the storage for a first value which is a random number, the storage for a third value which is a random number, and software means for providing a second value which is unique to the application program.

7. A circuit for assuring that software is utilized only on computers for which it has been specifically authorized comprising:

a first means furnishing a plaintext value unique to the circuit, means for furnishing an initial value, a hardware encoding circuit responding to signals furnished in executing programs on the computer for executing an encoding algorithm to generate from the plain text value and the initial value a code value unique to a particular computer, means for storing a password generated using the encoding algorithm from the plaintext value and a value which is unique to an application program and to the particular computer, means for selectively providing:
  a fixed value as the initial value to the hardware encoding circuit in response to execution by the computer of a first process, and
  a value generated utilizing the password in response to execution by the computer of a second process, a comparator for testing the stored password against code value generated by the hardware encoding circuit in response to running the second process each time the application program is run and for generating an error signal if the stored password and the newly generated code value do not match, and means for impairing the operation of the particular computer in response to the error signal.

8. A circuit as claimed in claim 7 in which the hardware encoding circuit and comparator share an address with other component circuitry on a computer input/output bus.

9. A method for assuring that software is utilized only on computers for which it has been specifically authorized comprising:

storing a plaintext value and a key value in firmware in a computer, encrypting by means of a hardware encoding circuit of a computer the plaintext value with a constant value utilizing the key value to generate a code value unique to a particular computer, storing a password obtained by encrypting the plaintext value with a value unique to an application program utilizing the key value, testing the stored password against a verification value generated by the hardware encoding circuit by encrypting the plaintext value with a value unique to an application program utilizing the key value when the application program is run, generating an error signal if the stored password and the newly generated verification value do not match, and impairing the operation of the particular computer in response to the error signal.

* * * * *